Feb. 28, 1967  J. D. TURLAY  3,306,271
INTERNAL COMBUSTION ENGINE WITH SINGLE OVERHEAD CAMSHAFT
AND HEMISPHERICAL COMBUSTION CHAMBERS
Filed Jan. 19, 1966                               2 Sheets-Sheet 1

INVENTOR.
Joseph D. Turlay
BY
Robert J. Outland
ATTORNEY

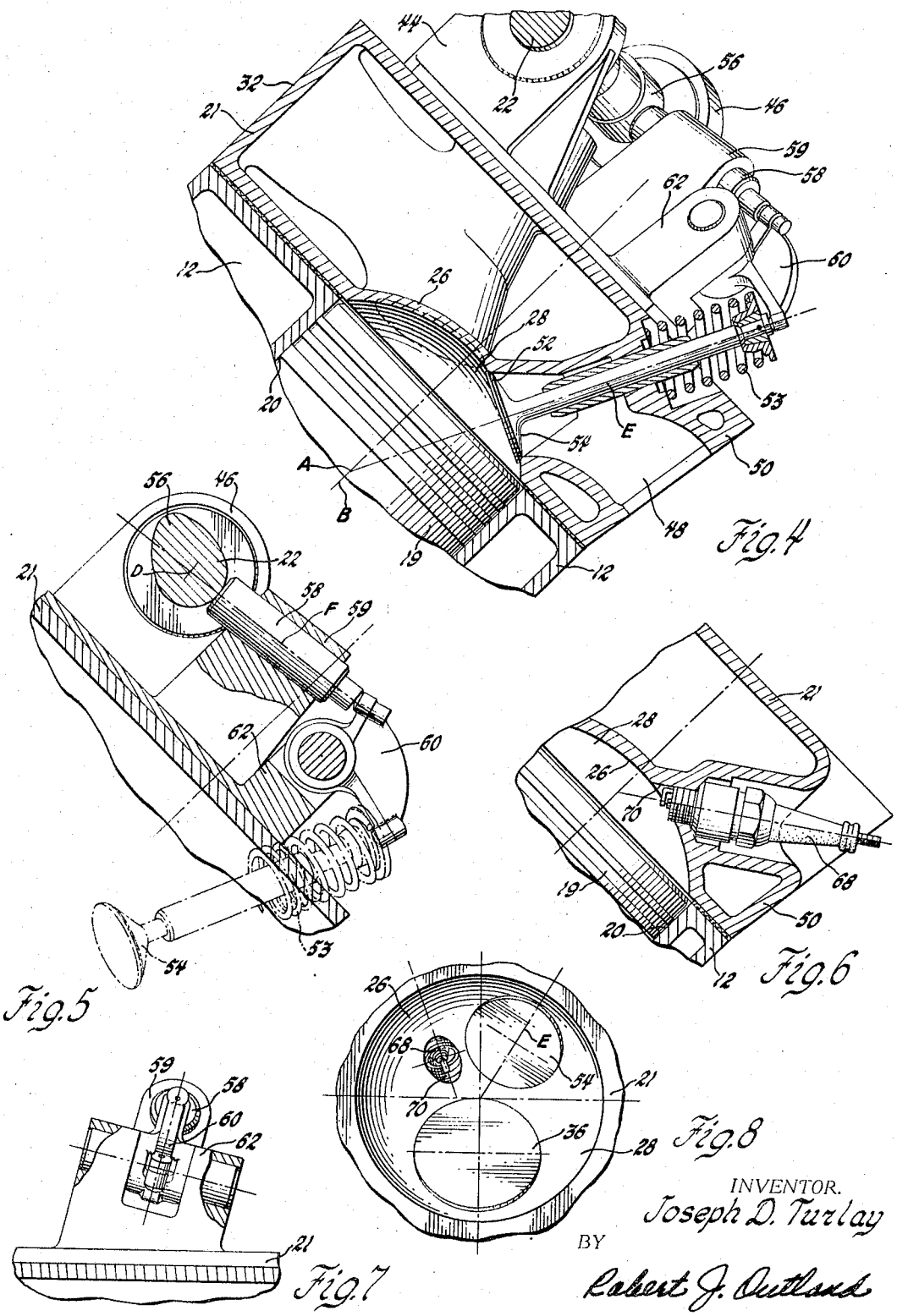

United States Patent Office 3,306,271
Patented Feb. 28, 1967

3,306,271
INTERNAL COMBUSTION ENGINE WITH SINGLE OVERHEAD CAMSHAFT AND HEMISPHERICAL COMBUSTION CHAMBERS
Joseph D. Turlay, Flint, Mich., assignor to General Motors Corporation, Detroit, Mich., a corporation of Delaware
Filed Jan. 19, 1966, Ser. No. 521,676
7 Claims. (Cl. 123—90)

It is well-known in the art that in designing spark ignition engines for maximum horsepower, it is advantageous to utilize, where possible, so-called hemispherical combustion chambers, large free-breathing valves, light and rigid valve actuating mechanism, and a nearly central location of the spark plug in the combustion chamber. In engines having these features, it is common practice to utilize, a pair of overhead camshafts for each cylinder bank, operating the valves through cup-type followers mounted over the valve springs. V-eight engines of this type require four camshafts, two for each bank, and become very wide, making chassis installation difficult. The drive for the four camshafts is complicated and the assembly becomes very expensive.

The present invention provides a valve gear arrangement in which the foregoing advantages are provided in a construction utilizing a single overhead camshaft for each bank of the engine, reducing the complexity and cost as well as the width of the engine arrangement.

It is, therefore, a feature of this invention that it provides a combustion chamber having one wall thereof formed as a portion of a sphere.

A further feature of the invention is that inlet and exhaust valves are provided which are reciprocably actuatable on axes which intersect one another at the center of the hemispherical combustion chamber surface.

Yet another feature of the invention is that the inlet and exhaust valves and the spark plug opening are arranged in a triangular pattern enclosing the cylinder axis so that the spark plug is as close to the center of the combustion chamber as is consistent with the use of the largest inlet and exhaust valves possible.

Still another feature of the invention is that the inlet valve is actuated directly by a single overhead camshaft which is rotatable on an axis intersected by and perpendicular to the inlet valve axis.

A further feature of the invention is that the exhaust valve is actuated by the single overhead camshaft through a cam follower contacting the camshaft at a portion axially spaced from the inlet valve, said cam follower contacting a rocker arm which in turn actuates the exhaust valve, said rocker arm being mounted for rocking movement in the plane defined by the axis of reciprocation of the cam follower and the axis of reciprocation of the exhaust valve.

Yet another feature of the invention is that bearing support means are provided for the camshaft adjacent each of the inlet and exhaust cams so as to provide a relatively inflexible valve train.

These and other features of the invention will be more clearly understood from the following description and drawing of a single embodiment of the invention selected for purposes of illustration and in which:

FIGURE 4 is a cross-sectional view taken generally in the plane of the exhaust valve as indicated by the line 4—4 of FIGURE 2;

FIGURE 5 is a cross-sectional view taken generally in the plane of the exhaust cam follower as indicated by the line 5—5 of FIGURE 2;

FIGURE 6 is a cross-sectional view taken generally in the plane of the spark plug as indicated by the line 6—6 of FIGURE 2;

FIGURE 7 is a side view partially in section taken generally along the plane indicated by the line 7—7 of FIGURE 2 and showing an exhaust rocker arm; and FIGURE 8 is a bottom view of the combustion chamber taken generally along the plane indicated by the line 8—8 of FIGURE 3.

Figure 1:
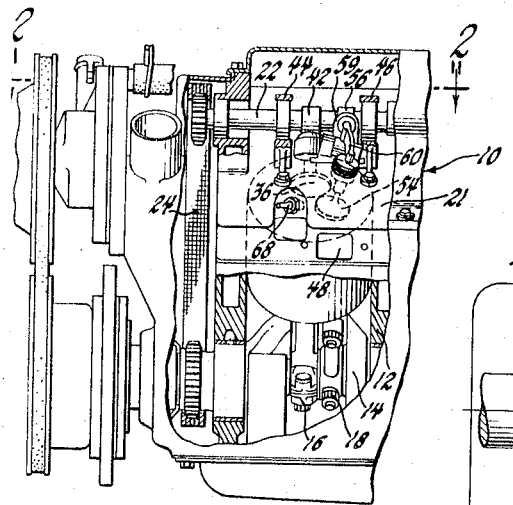
FIGURE 1 illustrates a fragmentary side view of an engine partially broken away to show overhead camshaft valve gear according to the invention.
Figure 2:
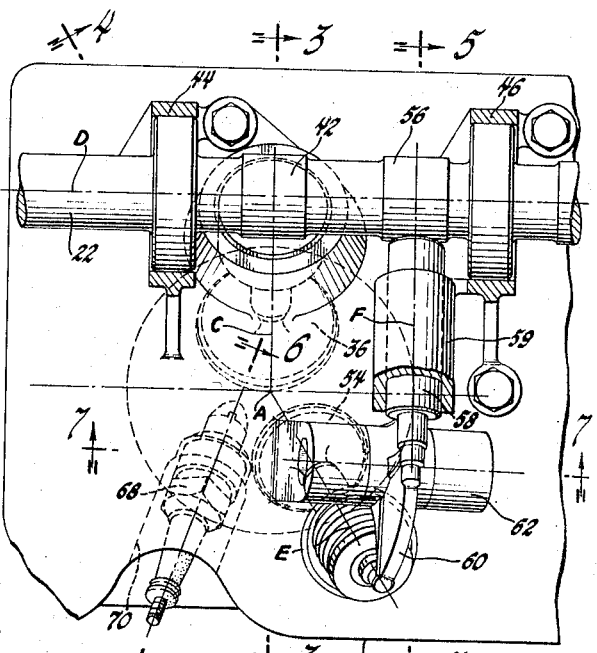
FIGURE 2 shows a top view of the valve gear of FIGURE 1 taken generally along the plane indicated by the line 2—2 of the figure.
Figure 3:
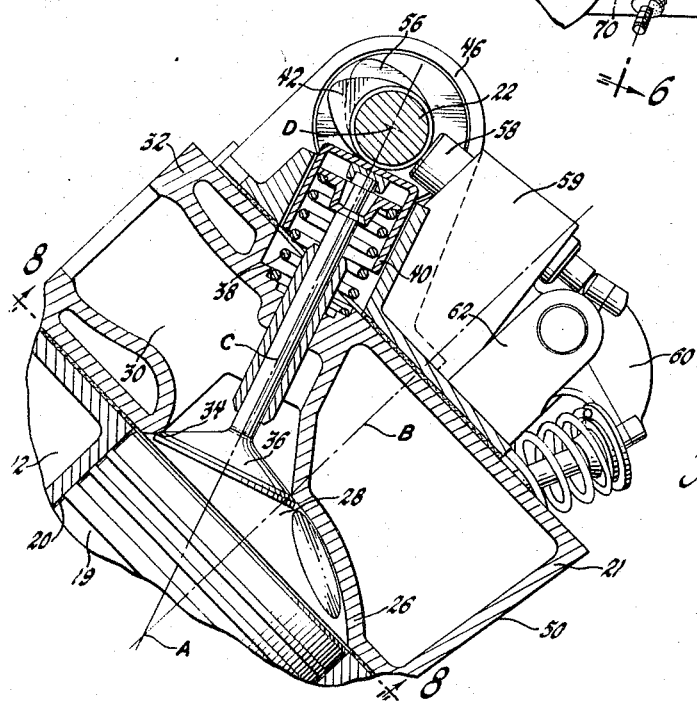
FIGURE 3 is a cross-sectional view taken generally in the plane of the inlet valve as indicated by the line 3—3 of FIGURE 2.

Referring more specifically to the drawings, numeral 10 generally indicates a V-type internal combustion engine having a cylinder block 12 carrying the usual crankshaft 14 carrying connecting rods 16 and 18 connecting with pistons 19 reciprocably disposed in right and left banks of cylinders 20 respectively. Each bank of cylinders 20 carries a cylinder head 21 closing the upper end of cylinders 20 thereof and mounting an overhead camshaft 22 which is driven from the crankshaft by suitable means such as chain 24.

The cylinder head 21 includes a combustion chamber defining wall 26 located adjacent the end of each cylinder 20 and formed as a portion of a sphere having its center A on the axis B of the cylinder 20. Wall 26 cooperates with piston 19 to define a combustion chamber 28 of the type commonly known as a hemispherical combustion chamber.

Chamber 28 communicates with an inlet manifold (not shown) through an inlet passage 30, opening through an inner wall 32 of the cylinder head and terminating in a valve seat 34 adjacent wall 26. Flow through the passage is controlled by an inlet valve 36 which is adapted to contact the valve seat 34 in the usual manner and is reciprocable along an axis C which intersects the center A of spherical wall 26. This permits the valve seat 34 to be formed as a small circle of the spherical wall eliminating the need for recessing the valve.

Valve 36 is biased in a closing direction by the usual spring means 38 and carries a cup-type follower 40 at its outer end which is directly engaged by inlet cam 42 of the camshaft 22. The camshaft is carried by bearing supports 44 and 46 of the cylinder head and is rotatable on an axis D which is parallel to the crankshaft axis as well as perpendicular to the axis C of inlet valve 36.

Combustion chamber 28 communicates with an exhaust manifold (not shown) through exhaust passage 48 which opens through an outer wall 50 of the cylinder head and terminates in a valve seat 52. Valve seat 52 is formed in an outer portion of wall 26 but has its center offset to one side of the lateral plane which passes through inlet valve axis C and is perpendicular to camshaft axis D. The exhaust passage is controlled by an exhaust valve 54 which is adapted to seat against valve seat 52 and is biased in a closing direction by spring means 53. Exhaust valve 54 is reciprocably movable on an axis E which intersects valve axis C and cylinder axis B at the center A of the spherical wall 26. Thus the exhaust valve seat 52 is also permitted to be a small circle of spherical surface as is the inlet valve.

Actuation of the exhaust valve is accomplished through an exhaust cam 56 located on camshaft 22 adjacent bearing support 46 and spaced axially from inlet cam 42 in the direction of the exhaust valve seat offset. The cam follower 58, which may be of any suitable mechanical or hydraulic type, is mounted in support 59 for reciprocating movement on an axis F extending perpendicular to the axis D of camshaft rotation.

The cam follower 58 contacts a rocker arm 60 which is pivotally carried on a bifurcated support portion 62 of the cylinder head and in turn contacts the end of the stem of exhaust valve 54. The rocker arm is mounted for rocking movement in the plane which passes through the cam follower axis F and the exhaust valve axis E so that proper exhaust valve train geometry is maintained without the necessity of side thrust loading on the rocker arm, the exhaust valve, or the cam follower.

The cylinder head also carries a spark plug 68 which is retained in opening means 70 extending through wall 26 near the cylinder axis and forming a generally triangular pattern with the inlet and exhaust valve seats 34 and 52 respectively. The spark plug is positioned to enter the combustion chamber through the portion of the cylinder head which is left vacant by offsetting the exhaust valve to one side of the transverse plane passing through the inlet valve axis C thus permitting the spark plug location to be as near the center of the combustion chamber 28 as possible consistent with the use of the largest possible inlet and exhaust valves.

The foregoing illustrative embodiment provides an ideal arrangement of the spark plugs and valves in connection with hemispherical combustion chambers. The use of valves having their axes inclined so as to intersect the center of the spherical radius of the combustion chamber wall not only avoids angular recessing of the valves but permits use of the largest valves possible for a given cylinder size consistent with the low surface to volume ratio of the hemispherical chamber.

These advantages are obtained with only a single overhead camshaft for each cylinder bank. Direct actuation of the inlet valves by the camshaft without provision for clearance adjustment appears feasible due to the low operating temperatures of inlet valves and their consequent freedom from seat pound-in, however it is within the scope of the present invention to incorporate suitable clearance adjusting means between the camshaft and inlet valve.

It should be understood that the foregoing description is of a single embodiment selected for the purposes of illustration only and the invention is intended to include such changes and modifications as are encompassed within the spirit and scope of the invention as defined by the following claims.

I claim:
1. In an internal combustion engine,
a combustion chamber defining wall forming a portion of a sphere,
fluid flow passages through said wall and terminating in a pair of valve seats,
first and second poppet valves adapted to engage said valve seats to close said passages, said valves being movable on axes intersecting the center of said sphere,
a camshaft rotatably mounted over and operably engaging said first valve, said camshaft having an axis perpendicular to and intersected by the axis of said first valve and
mechanism operably connecting said second valve with said camshaft
whereby both said passages are controlled by a single camshaft.

2. The combination of claim 1 wherein said valve seats are disposed in opposite portions of said wall, the valve seat engageable by said second valve being at least partially offset with respect to a plane perpendicular to said camshaft axis and defined by the axis of said first valve.

3. The combination of claim 2 wherein said connecting mechanism comprises a cam follower operably engaging said camshaft at a location axially spaced from said first valve, said follower being reciprocably movable along an axis perpendicular to said camshaft axis and a rocker arm between said cam follower and said second valve and mounted for rocking motion in a plane defined by said follower axis and said second valve axis.

4. The combination of claim 3 and further comprising spark ignition means through said wall, and forming with said valve seats a triangular pattern surrounding the center of said wall.

5. The combination of claim 4 wherein said passages include inlet and exhaust passages, said first valve controlling said inlet passage and said second valve controlling said exhaust passage.

6. In an internal combustion engine having a cylinder and a cylinder head closing the end of said cylinder, said cylinder having an axis,
a combustion chamber defining wall in said cylinder head and closing the end of said cylinder, said wall forming a portion of a sphere having a center on said cylinder axis,
inlet and exhaust passages through said cylinder head and terminating at said wall in a pair of valve seats, said inlet valve seat being centered on the transverse plane through said cylinder axis,
spark ignition means in said cylinder head and extending through said wall, said spark ignition means and said valve seats forming a generally triangular pattern surrounding said cylinder axis,
inlet and exhaust poppet valves engageable with said inlet and exhaust valve seats, respectively, said valves being movable on axes intersecting the center of said sphere and said inlet valve axis lying in said transverse plane,
a camshaft carried on said cylinder head for rotation about a longitudinal axis intersected by said inlet valve axis, said camshaft operably engaging said inlet valve for direct actuation thereof and
mechanism between said camshaft and said exhaust valve for actuation of said exhaust valve by said camshaft.

7. The combination of claim 6 wherein said actuation mechanism comprises a cam follower operably engaging said camshaft at a location axially spaced from said inlet valve, said follower being reciprocably movable along an axis perpendicular to said camshaft axis, and a rocker arm between said cam follower and said exhaust valve and mounted for rocking motion in a plane defined by said follower axis and said exhaust valve axis.

References Cited by the Examiner

UNITED STATES PATENTS

| 2,804,862 | 9/1957 | Nedwidek | 123—191 X |
| 2,954,023 | 9/1960 | Lampredi | 123—191 |
| 3,094,977 | 6/1963 | Sampietro | 123—191 |
| 3,137,283 | 6/1964 | Sampietro | 123—90 |
| 3,219,019 | 11/1965 | Palmer | 123—90 |

FOREIGN PATENTS 695,546   8/1953   Great Britain.

MARK NEWMAN, *Primary Examiner.*

AL LAWRENCE SMITH, *Examiner.*